United States Patent
Gilberton et al.

(10) Patent No.: US 9,609,376 B2
(45) Date of Patent: Mar. 28, 2017

(54) PROVISION OF A PERSONALIZED MEDIA CONTENT

(71) Applicant: THOMSON LICENSING, Issy de Moulineaux (FR)

(72) Inventors: Philippe Gilberton, Geveze (FR); Anthony Laurent, Vignoc (FR); Eric Gautier, Rennes (FR); Yvon Legallais, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/411,640

(22) PCT Filed: Jun. 28, 2013

(86) PCT No.: PCT/EP2013/063591
§ 371 (c)(1),
(2) Date: Dec. 29, 2014

(87) PCT Pub. No.: WO2014/001485
PCT Pub. Date: Jan. 3, 2014

(65) Prior Publication Data
US 2015/0163531 A1 Jun. 11, 2015

(30) Foreign Application Priority Data
Jun. 29, 2012 (EP) .................................... 12305777

(51) Int. Cl.
*H04N 7/173* (2011.01)
*H04N 21/2668* (2011.01)
(Continued)

(52) U.S. Cl.
CPC ... *H04N 21/2668* (2013.01); *H04N 21/23424* (2013.01); *H04N 21/242* (2013.01);
(Continued)

(58) Field of Classification Search
CPC ............. H04N 7/17318; H04N 7/1733; H04N 21/235; H04N 21/435; H04N 21/47202
(Continued)

(56) References Cited

U.S. PATENT DOCUMENTS 5,682,195 A 10/1997 Hendricks et al.
6,724,981 B1 * 4/2004 Park ........................ H04N 5/775
375/E7.021
(Continued)

FOREIGN PATENT DOCUMENTS

EP 1267572 12/2002
EP 2169853 3/2010
(Continued)

OTHER PUBLICATIONS http://www.invidi.com/itc_invidi_tech.html; INVIDI Technologies Corporation; 2014; p. 1 only.
(Continued)

*Primary Examiner* — Annan Shang
(74) *Attorney, Agent, or Firm* — Brian J. Dorini; Catherine A. Cooper

(57) ABSTRACT

Method for providing a personalized content having a determined sequencing of media contents, comprising steps of:
receiving, in a control channel, a control stream comprising temporal control information describing the content sequencing;
receiving media streams comprising the media contents of the sequencing; and
controlling a rendering of the personalized content by using said control information,
wherein the sequencing comprising a first live program followed by a second live program, the method further comprises a step of detection of an overlap of the first and second live programs.

14 Claims, 6 Drawing Sheets

(51) Int. Cl.
*H04N 21/234* (2011.01)
*H04N 21/44* (2011.01)
*H04N 21/462* (2011.01)
*H04N 21/81* (2011.01)
*H04N 21/242* (2011.01)
*H04N 21/258* (2011.01)
*H04N 21/262* (2011.01)

(52) U.S. Cl.
CPC . *H04N 21/25891* (2013.01); *H04N 21/26241* (2013.01); *H04N 21/26283* (2013.01); *H04N 21/44016* (2013.01); *H04N 21/4622* (2013.01); *H04N 21/812* (2013.01)

(58) Field of Classification Search
USPC .............. 725/91–93, 114–116; 709/231, 232
See application file for complete search history.

(56) References Cited

U.S. PATENT DOCUMENTS

| | | | | |
|---|---|---|---|---|
| 7,474,359 | B2* | 1/2009 | Sullivan | H04N 5/4401 348/14.12 |
| 7,646,435 | B2* | 1/2010 | Teichner | H04N 21/41422 348/473 |
| 7,769,035 | B1* | 8/2010 | Breau | H04L 47/10 370/392 |
| 7,836,095 | B2 | 11/2010 | Adwankar et al. | |
| 7,925,771 | B1* | 4/2011 | Ping | H04L 65/4092 709/203 |
| 8,396,960 | B2* | 3/2013 | Martinez | H04L 65/602 348/14.03 |
| 8,572,646 | B2* | 10/2013 | Haberman | G11B 27/031 705/14.49 |
| 8,631,143 | B2* | 1/2014 | Simonds | H04N 21/21805 709/225 |
| 8,892,691 | B2* | 11/2014 | Pantos | G06F 17/30053 709/219 |
| 9,538,214 | B2* | 1/2017 | Reimers | H04N 21/2385 |
| 2002/0083439 | A1 | 6/2002 | Eldering | |
| 2003/0021346 | A1* | 1/2003 | Bixby | H04N 21/44016 375/240.25 |
| 2003/0142689 | A1 | 7/2003 | Haberman et al. | |
| 2003/0172378 | A1 | 9/2003 | Lalitha et al. | |
| 2005/0078757 | A1* | 4/2005 | Nohrden | H04N 5/4401 375/240.28 |
| 2006/0089835 | A1* | 4/2006 | Bisson | G10L 15/22 704/257 |
| 2006/0136224 | A1* | 6/2006 | Eaton | G10L 21/028 704/277 |
| 2008/0098446 | A1* | 4/2008 | Seckin | H04L 12/185 725/114 |
| 2008/0101421 | A1* | 5/2008 | Gordon | H04N 21/23424 370/535 |
| 2008/0271080 | A1 | 10/2008 | Gossweiler et al. | |
| 2009/0064160 | A1* | 3/2009 | Larson | G06F 17/30336 718/104 |
| 2009/0064228 | A1 | 3/2009 | Lin | |
| 2009/0106801 | A1* | 4/2009 | Horii | H04N 5/775 725/91 |
| 2009/0113512 | A1* | 4/2009 | Collet | H04N 7/173 725/132 |
| 2009/0299757 | A1* | 12/2009 | Guo | G10L 19/022 704/500 |
| 2010/0251304 | A1 | 9/2010 | Donoghue et al. | |
| 2011/0040050 | A1* | 2/2011 | Prenzel | C08F 2/38 526/70 |
| 2011/0246622 | A1* | 10/2011 | Pantos | H04L 65/1083 709/219 |
| 2011/0252118 | A1* | 10/2011 | Pantos | G06F 17/30053 709/219 |
| 2012/0311669 | A1* | 12/2012 | Akase | H04L 63/083 726/3 |
| 2013/0016791 | A1* | 1/2013 | Collard | H04L 65/607 375/240.25 |
| 2013/0335629 | A1 | 12/2013 | Laurent et al. | |
| 2015/0358671 | A1* | 12/2015 | Woodman | H04N 5/765 725/134 |

FOREIGN PATENT DOCUMENTS

| | | |
|---|---|---|
| EP | 1667452 | 11/2011 |
| KR | 101096804 | 12/2011 |

OTHER PUBLICATIONS

ETSI TS 102 822-2 V1.4.1 (Nov. 2007)Broadcast and On-line Services: Search, select, and rightful use of content on personal storage systems ("TV-Anytime");Part2: Phase 1—System description; pp. 1-127.

packetVISION: "Advanced IPTV Advertising—Solution overview"; Jun. 2009; pp. 1-9.

SIMONIS: "CPTV—Generating Personalized TV—Schedules"; SAIS Workshop, Uppsala, May 21, 2010; pp. 1-60.

Qi Etal: "Dynamic Broadcast"; Feb. 2011; pp. 1-2.

Search Report Dated Aug. 13, 2013.

* cited by examiner

PROVISION OF A PERSONALIZED MEDIA CONTENT

This application claims the benefit, under 35 U.S.C. §365 of International Application PCT/EP2013/063591, filed Jun 28, 2013, which was published in accordance with PCT Article 21(2) on Jan. 3, 2014 in English and which claims the benefit of European patent application No. 12305777.0, filed Jun. 29, 2012.

FIELD OF THE INVENTION

The present invention generally relates to the field of content delivery over a network. More particularly, the invention deals with the provision of a personalized television (TV) channel containing a sequence of multimedia contents interesting a particular user. Thus, the invention concerns a method, a receiver device and a provider device for providing a personalized media content. It also concerns a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some methods exist for specifically providing to a user a content in which said user may be interested, i.e. a personalized content.

One example is the one that addresses targeted advertizing by using a combination of broadcast and push delivery methods. Advert videos are pushed to the user's set-top box hard drive where a decision engine selects, versus household profiling, the most appropriate advert video and ensures its synchronization in the broadcast stream.

The document EP1667452 describes an extension of this use case and evocates the notion of a "Virtual personalized TV channel", wherein a locally stored advert or a media content insertion/substitution is launched in response to a message sent from a service provider. Then, an advert or media content selection process is run according to different rules (user profile, advert score, media content type, time of the day, parental control) before being played out during a fixed time slot in between two other media contents. This document details a selection algorithm using several table descriptors. However, this document does not describe how to ensure seamless TV program sequencing of the different programs constituting the virtual channel.

Another example is the TVanytime (TVA) initiative which is a set of specifications, detailed in the ETSI (European Telecommunications Standards Institute) TS 102822-2, dedicated to the controlled delivery of a media content to a user's local storage device. TVanytime allows the end user to record from an Electronic Program Guide (EPG) any TV program that the user designated in order for him to watch it at a most convenient time. However, this solution presents a recurrent inaccuracy due to live events that regularly impact the initial scheduling and could give a weak user quality of experience.

SUMMARY OF THE INVENTION

The present invention proposes a solution for improving the situation.

Accordingly, the present invention provides a method for providing a personalized content having a determined sequencing of media contents, comprising steps of:
- receiving, in a control channel, a control stream comprising temporal control information describing the content sequencing;
- receiving media streams comprising the media contents of the sequencing; and
- controlling a rendering of the personalized content by using said control information.

The sequencing of the media contents, which are for instance television programs, may be advantageously predetermined through an agreement between a user and a provider or only by the provider using the user's preferences and tastes for TV programs.

As an example, the personalized content is a thematic channel offered to a group of subscribers. As the TV programs constituting the thematic channel are retrieved directly at the receiver's side, the method of the present invention permits the provision of such channel with minimal operational costs at the provider's side.

Preferably, the media contents originate from corresponding television channels.

The television channels may be received through a broadcast network or through a broadband network. For instance, such television channels may comprise IPTV channels.

Advantageously, the control and the television channels are time aligned to a common reference clock.

The common reference clock is, for instance, a wall clock expressed in UTC (Coordinated Universal Time).

Preferably, the control and the media streams comprise temporal information for aligning the control and the television channels to the common reference clock.

These information may be inserted in a timeline which translates the System Time Clock (STC) of the considered stream in the Time of Day (ToD) of the reference clock.

The use of this timeline enables a seamless switching between the television channels, which ensures a seamless transition between a media content, such as a TV program, to the next when rendering the personalized content.

Advantageously, the personalized content comprises a previously stored content in a user's device.

Such content may be an advertisement, a movie trailer, a cover page of the personalized channel, or any combination of these elements. It is inserted in order to ensure a smooth transition from a TV program to the next when these programs are not joined.

Preferably, the step of controlling the rendering of the personalized content uses fading control between consecutive contents of the sequencing.

Performing such fading control permits a smooth transition between the media contents of the personalized channel.

Advantageously, the media streams are received over broadcast and/or broadband networks.

According to one embodiment, the sequencing comprises a first live program followed by a second live program.

A live program is advantageously defined as a program being broadcast in real-time, as events happen, in the present.

Advantageously, the method further comprises a step of detection of an overlap of the first and second live programs.

By using such detection, it is possible to timeshift the rendering of the second live program until the first live program is finished. Thus, the user does not miss the last part of the first live program due to the planned switching to the second live program.

Advantageously, the detection of an overlap of the first and second live programs is based on statistical processing of data collected prior to a switch from the first live program to the second live program.

Alternatively, the detection of an overlap of the first and second live programs is based on a monitoring of a social network.

The invention also provides a receiver device for providing a personalized content having a determined sequencing of media contents, comprising:
- a first interface for receiving, in a control channel, a control stream comprising temporal control information describing the content sequencing;
- a second interface for receiving media streams comprising the media contents of the sequencing; and
- a scheduler for controlling a rendering of the personalized content by using said control information.

Advantageously, the sequencing comprising a first live program followed by a second live program, the receiver device further comprises a detection module for detecting an overlap of the first and second live programs.

Advantageously, the receiver device is a gateway or a set-top box.

The invention further provides a provider device for providing a personalized content having a determined sequencing of media contents, comprising:
- a program manager for defining temporal control information describing the content sequencing;
- a first transmitter for transmitting, in a control channel, a control stream comprising said temporal control information; and
- a second transmitter for transmitting media streams comprising the media contents of the sequencing.

Advantageously, the sequencing comprising a first live program followed by a second live program, the provider device further comprises a detection module for detecting an overlap of the first and second live programs.

Advantageously, the program manager is able to update the temporal control information.

This update may be carried periodically or only when a change in a TV program occurs, for example, when a live program lasts more than the initial time planned for it.

The method according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the method of the invention. The diagrams of FIGS. 4 to 7 illustrate examples of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
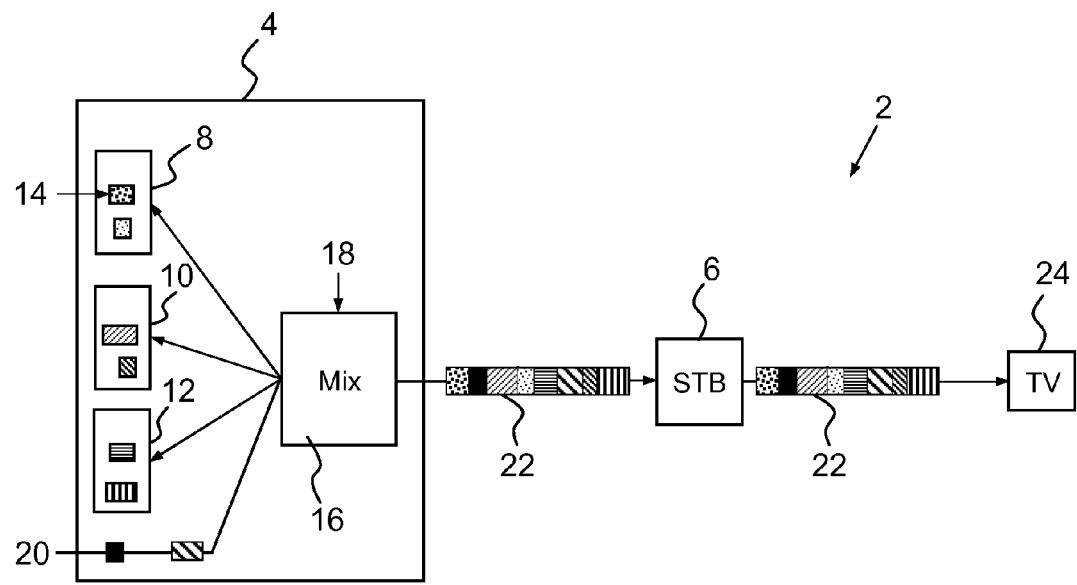
FIG. 1 is a schematic view of an embodiment of a system for providing a linear TV program according to the prior art.

Referring to FIG. 1, there is shown therein a schematic view of a system 2 for providing a linear TV program according to the prior art. This system 2 corresponds more particularly to a conventional TV broadcast playout.

The system 2 comprises a provider device 4 located at a TV program aggregator side such as a bouquet operator that groups a set of services across different transport streams, which themselves could be located across different networks.

The system 2 also comprises a receiver device 6 located in a user's home, such as a set-top box or a home gateway.

The provider device 4 comprises a plurality of servers 8, 10, 12.

For instance, the server 8 is a content server comprising a memory 14 for storing multimedia content, such as movies, cartoons, etc. The server 10 is, for example, a server adapted for storing pre-recorded TV programs, such as variety programs, educational programs, etc. The server 12 is adapted for storing other types of programs, such as advertizing programs.

The provider server 4 also comprises a mixer 16, which is able to mix, using a predefined scheduling 18, the programs forming a linear TV program flow that the user will receive, from the servers 8, 10, 12 as well as from live TV programs 20 directly received by the mixer 16. Such live programs may include news, sport events, musical programs, etc.

The mixer 16 is then able to provide the linear TV program 22 formed by the scheduled playlist of programs in a TV channel that the receiver device 6 is able to receive and to transmit to a rendering device 24, as a TV set, for playing back the content to the user.

The TV channel of the prior art provides usually either a generalist TV program or a thematic channel interesting a particular audience formed by a plurality of users, as children, teenagers, elderly, sportsmen, etc.

This conventional system 2 of the prior art implies an important operational cost for the content provider, so that the launch of a new channel could be risky in terms of Return On Investment (ROI) if there is a probability to not have enough success in terms of number of subscribers.

Besides, the consequence to launch a new program uses an additional network bandwidth which is a more and more scarce and expensive resource.

The present invention proposes a solution avoiding such prohibitive cost to the provider and permitting to offer a new TV channel, i.e. a thematic channel, targeting a personalized user preference. An example of a system 30 according to the invention is shown on FIG. 2.

Figure 2:
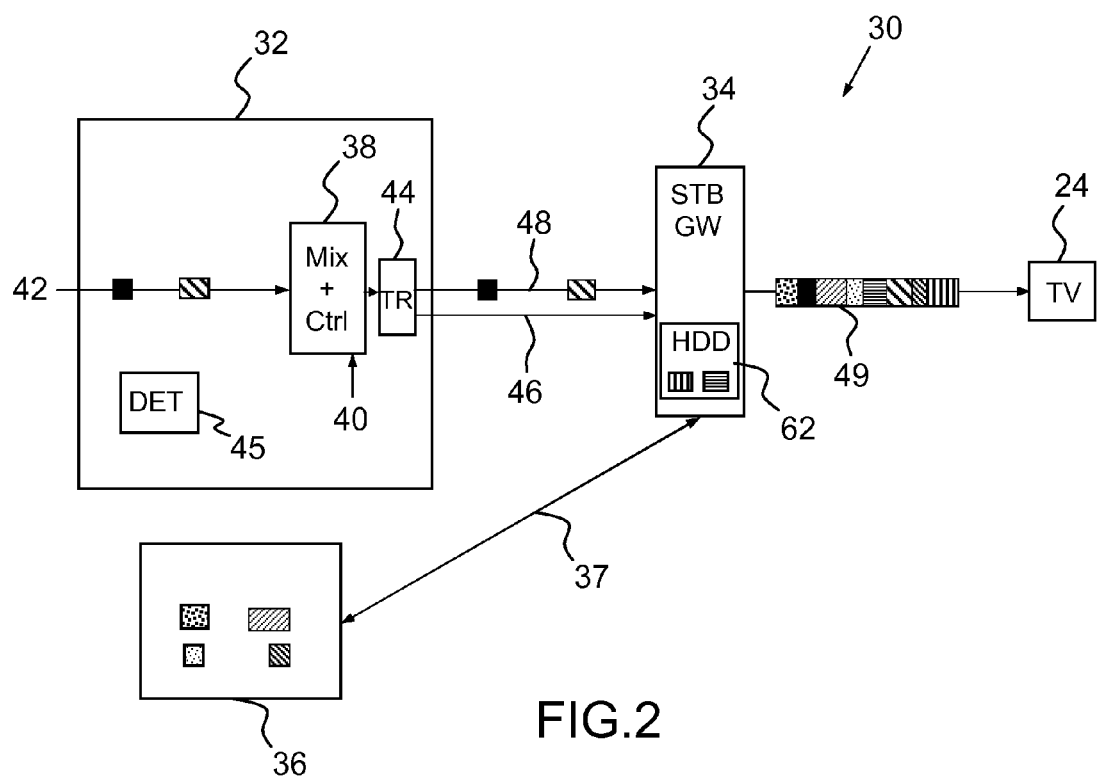
FIG. 2 is a schematic view of an embodiment of a system for providing, in a hybrid network architecture, a non-linear and personalized TV program according to the invention.

As shown on FIG. 2, the system 30 comprises a broadcast content provider device 32 and a receiver device 34.

Preferably, the system 30 also comprises a broadband content provider device 36. Preferably, the broadband content provider is able to stream stored TV program and may be accessed by the receiver device 34 through a broadband link 37. Optionally, the device 36 may be used as a catch-up server.

Thus, remarkably in this case, the provider device 32 is preferably dedicated, but not exclusively, for live streaming. Here, the provider device 32 mainly comprises a program manager 38 for defining temporal control information describing a program sequencing of the personalized content requested by the user.

The program manager 38 is also in charge of mixing, using a predefined scheduling 40, programs 42, as for example live programs, that could be part of the personalized content.

Besides, the provider device 32 comprises a transmitter 44 for transmitting, in a control channel, a control stream 46 comprising the temporal control information defined by the program manager 38 according to a user request.

The transmitter 44 is also able to transmit a content stream 48, resulting from the mixing 38 and scheduling 40, that the receiver device 34 is able to receive and to transmit to the rendering device 24, for example a TV set, for playing back the content to the user.

Furthermore, the provider device 32 comprises a detection module 45 able to detect an overlap of successive live programs.

A memory 62 in the receiver device 34 is provided to store the content 48. This content is then used by the receiver device 34, according to the temporal control information in the control stream 46, to form a personalized content stream 49 that constitutes the requested personalized TV channel.

Figure 3:
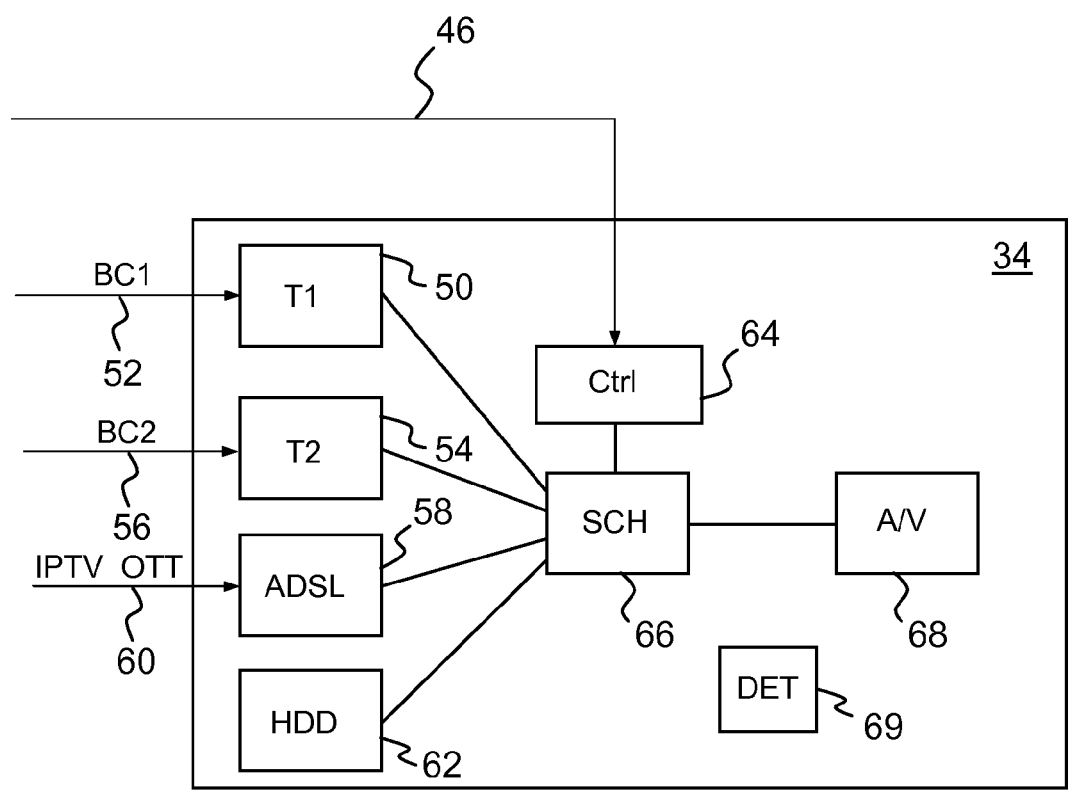
FIG. 3 is a schematic view of a receiver device according to an embodiment of the present invention.

The structure of the receiver device 34, according to an embodiment of the invention, is further detailed in the description below with reference to FIG. 3.

The receiver device 34 comprises a first tuner 50 able to receive a first broadcast stream 52 over a first broadcast channel and a second tuner 54 able to receive a second broadcast stream 56 over a second broadcast channel.

The receiver device 34 further comprises a broadband interface 58, such as an ADSL (Asymmetric Digital Subscriber Line) connection, able to receive IPTV (Internet Protocol TeleVision) and/or OTT (Over The Top) streams over a broadband channel 60.

As already described above, the receiver device 34 also comprises the memory 62, such as a HDD (Hard Disk Drive) or a Flash memory, a SD card etc., mainly for storing TV programs. This memory 62 enables a timeshift of a received TV program.

Furthermore, the receiver device 34 comprises a control interface 64 for receiving the control stream 46 comprising the temporal control information describing the program sequencing of the personalized content. The control interface 64 may be a tuner when the control stream 46 is broadcast or a broadband interface when the control stream 46 is transmitted over a broadband channel, as IPTV or OTT, for instance in the form of a multicast service.

The control stream 46 transporting the control information may be processed continuously or on a regular basis like the processing conventionally implemented for an Electronic Program Guide (EPG).

Although the control interface 64 has been represented as a separate entity, it may consist in one of the tuners 50, 54, or in the broadband interface 58.

Besides, the receiver device 34 comprises a scheduler 66 connected to the tuners 50, 54, the broadband interface 58, the memory 62 and the control interface 64. The main role of the scheduler 66, according to the invention, is to control the rendering of the personalized content by using the control information carried in the control stream 46.

The receiver device 34 further comprises an audio/video (A/V) decoder 68 connected to the scheduler 66.

Furthermore, the receiver device 34 comprises a detection module 69 able to detect an overlap of successive live programs.

Thus, the scheduler 66 has access on one hand to the control, broadcast, broadband interfaces and to the memory and on the other hand to the A/V decoder in order to execute commands coming within the control stream 46.

According to a preferred embodiment of the present invention, the media streams 52, 56, 60 and the control stream 46 comprise temporal information for aligning the control and television channels to a common reference clock, as a wall clock expressed in UTC. These temporal information are inserted in a timeline component which translates the System Time Clock of the considered stream in the Time Of Day (ToD) of the reference clock.

The flowcharts of FIGS. 4 to 7 detail the steps of the method of the invention for providing a personalized content, according to different embodiments. For clarity of the figures, the media components are presented already aligned to the reference clock Ref Clk thanks to the timeline component Vc.

Figure 4:
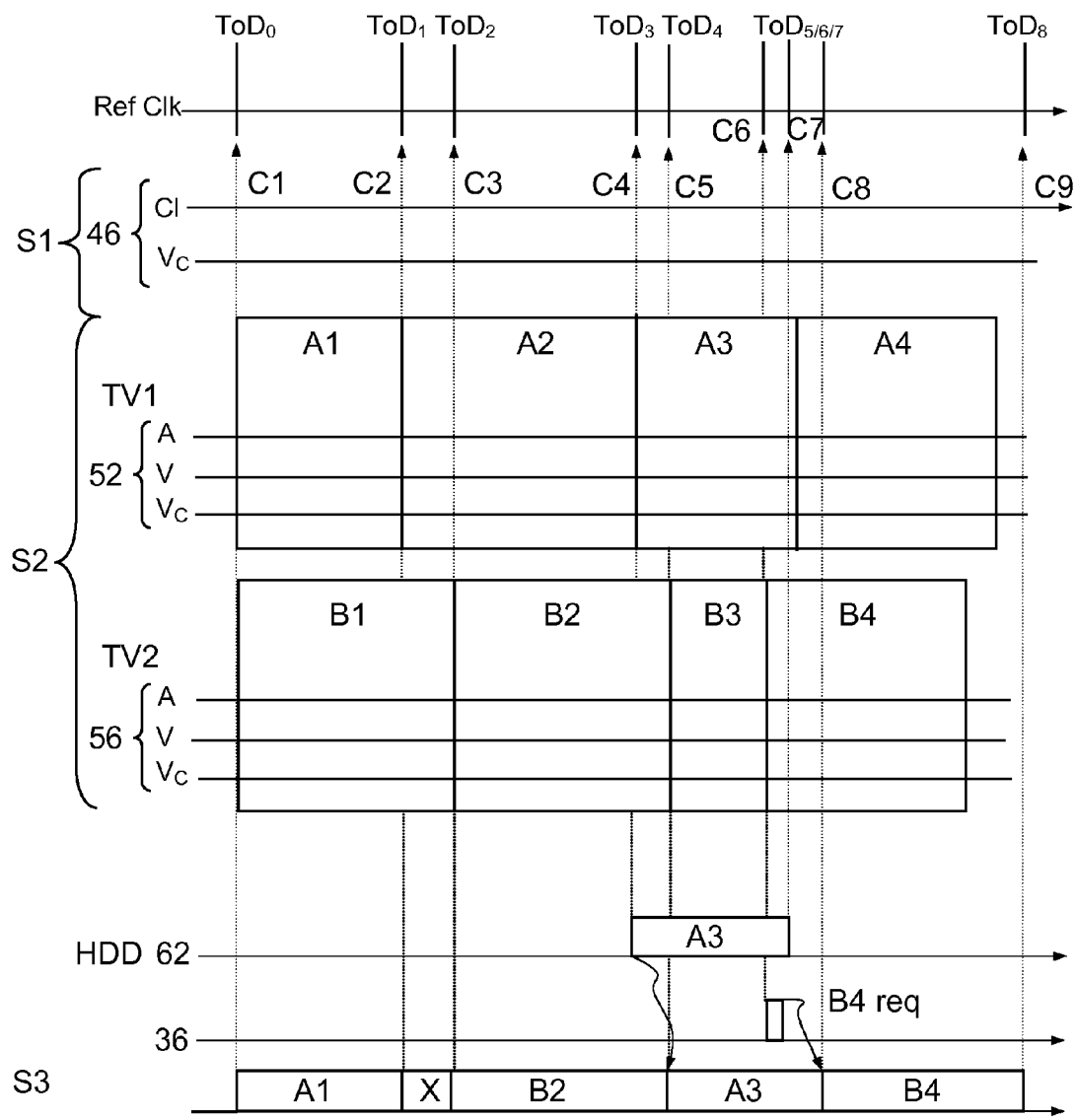
FIG. 4 is a flowchart showing the steps of a method for providing a personalized content according to a first embodiment of the present invention.

The first embodiment, illustrated in FIG. 4, concerns a personalized content consisting on a sequencing of different non-live TV programs originating from two different sources, i.e. two different television channels. Thus, the scheduler 66 switches back and forth from one source to the other. For instance, some programs A1, A3 of the personalized content originate from a first TV channel TV1. They are broadcast over the first broadcast channel and received by the first tuner 50. Other programs B2, B4 originate from a second TV channel TV2. They are broadcast over the second broadcast channel and received by the second tuner 54. Even if not illustrated, the second TV channel TV2 may also be transmitted over the broadband channel and received by the broadband interface 58.

In a first step S1, the control interface 64 of the receiver device 34 receives the control stream 46 which comprises a sequence of control commands CI allowing said receiver 34 to recover the personalized content.

For example, the sequence CI comprises the following commands:

C1: start to play A1;
C2: stop to play A1 and fade A1 to X;
C3: stop to play X and switch to the second broadcast stream 56 and start to play B2;
C4: start timeshifting of A3 on the memory 62;
C5: switch to the first broadcast stream 52 and fade B2 to A3 and start to play A3;
C6: send request to get B4 from the catch-up server 36;
C7: stop timeshifting of A3 on the memory 62;
C8: switch to the second broadcast stream 56, fade A3 to B4 and start to play B4;
C9: stop to play B4, in which a content X inserted between A1 and B2 is a separated or a combination of advertisement, movie trailer and cover page of the personalized content. It has been previously stored and is available in the memory 62.

At a second step S2, the first tuner 50 and the second tuner 54 receive the first and the second broadcast streams 52, 56 respectively. These streams contain audio (A), video (V) and timeline (Vc) components.

Then, the control of the rendering of the personalized content is carried at step S3 according to the received commands Ci and using the reference clock which indicates the times of day ToDi when the different control commands Ci shall occur.

Preferably, smooth transition from one program to the following program of the personalized content is performed using fading control. If the TV programs are not joined, an alternate content is inserted, as the content X inserted between A1 and B2. Whatever the transition process is and to avoid any artifact due to discontinuity in the audio/video stream, the program switch shall be done by following the frame accurate indication of ToDi. At the receiver's level, this implies that the commands Ci are delivered to the receiver 34 sufficiently early to be processed at the requested moment.

Figure 5:
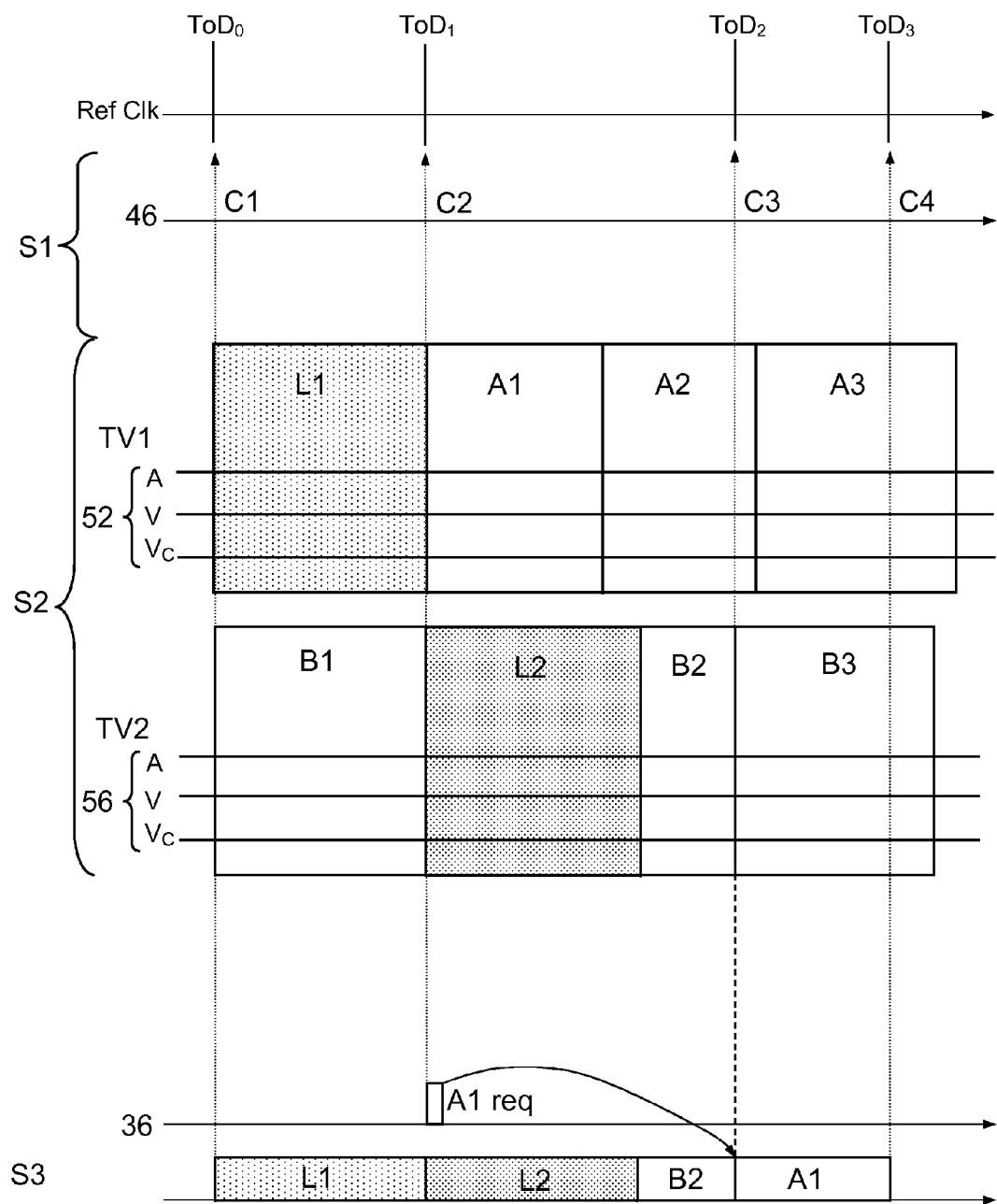
FIG. 5 is a flowchart showing the steps of a method for providing a personalized content according to a second embodiment of the present invention.

The second embodiment, illustrated in FIG. 5 illustrates the case of a switch between two live programs L1, L2 originating from a first TV channel TV1 and a second TV channel TV2, respectively. The TV channels TV1 and TV2 are broadcast on the first broadcast stream 52 and the second broadcast stream 56, respectively. Alternatively, although not represented, the TV channel TV2 may be transmitted in the broadband stream 60.

In this second embodiment, the live programs L1, L2 do not overlap, i.e., L1 is finished at the planned time before the beginning of L2.

The sequence of commands CI comprises the following commands:
C1: start to play L1;
C2: switch to the second broadcast stream 56, fade L1 to L2, start to play L2 then B2 and send request to get A1 from the catch-up server 36;
C3: fade B2 to A1 streamed from the catch-up server 36;
C4: stop to play A1.

This scenario is a very favorable scenario which is often non realistic as it is recurrent that live programs, especially in sport events, have an uncertain end time.

This means, in the case of FIG. 5, that the program L1 that was supposed to transition properly to the program L2 program will overlap with it. This implies that the control command C2 that was initially supposed to switch from L1 to L2 will have to run a different function prior to be passed to the receiver device 34. Several cases have to be envisaged in this particular scenario.

Figure 6:
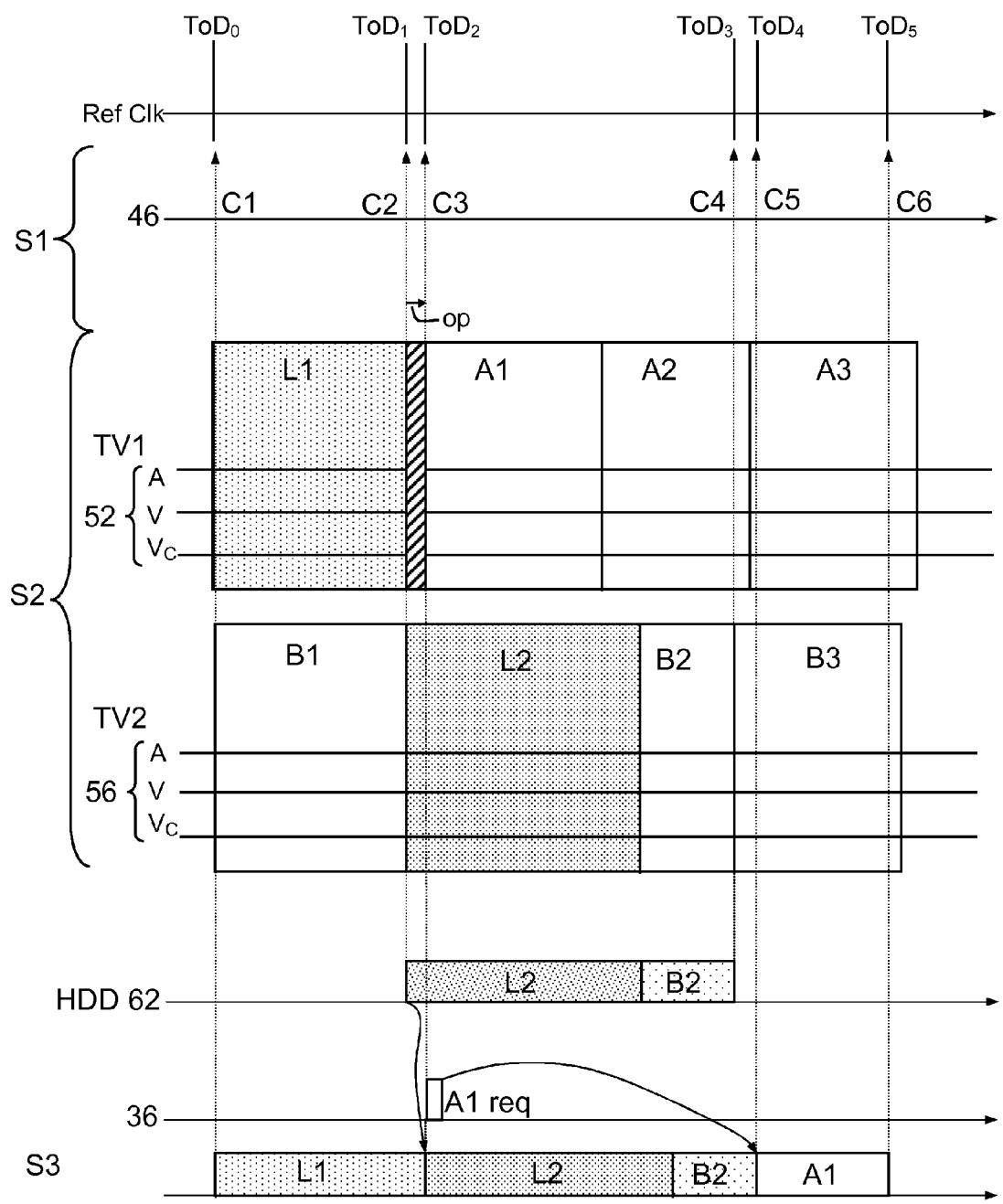
FIG. 6 is a flowchart showing the steps of a method for providing a personalized content according to a third embodiment of the present invention.

The first case is illustrated on FIG. 6. In this case, the live program L1 overlaps on the live program L2 which is a program available on the second broadcast stream 56, or alternatively on the broadband stream 60 (not represented).

The sequence of commands CI comprises the following commands:
C1: start to play L1;
C2: switch to the second broadcast stream and start timeshifting of L2 and B2 on the memory 62;
C3: start to play L2, while downloading it on the memory 62, and fade L1 to L2, then send request to get A1 from the catch-up server 36 and play B2 after L2 is ended;
C4: stop L2 and B2 timeshifting;
C5: fade B2 to A1 streamed from the catch-up server 36;
C6: stop to play A1.

Thus, in this case, the control command C2 is updated from "switch" to the second broadcast stream 56 and "fade" to L2 (FIG. 5) to "switch" to the second broadcast stream 56 and "timeshift" L2 on the memory 62.

In the particular case in which L2 is broadcast, the second tuner 54 is assumed to be available for the timeshifting purpose. In order for the user to watch the program L2 timeshifted on his memory 62, a new control command C3 "switch" from L1 to timeshifted L2 is added by the program manager 38 of the provider device 32 to the time sequencing in the control stream 46. This means that the control information have to be updated prior the C2 command to be passed to the receiver device 34. This constitutes a time constraint for the provider. It is a supplementary reason to deliver the control commands with a sufficient time margin including firstly the time synchronization and control command processing time to present properly the content on the display at the user's home and secondly the necessary updating process in case of live program changing.

Figure 7:
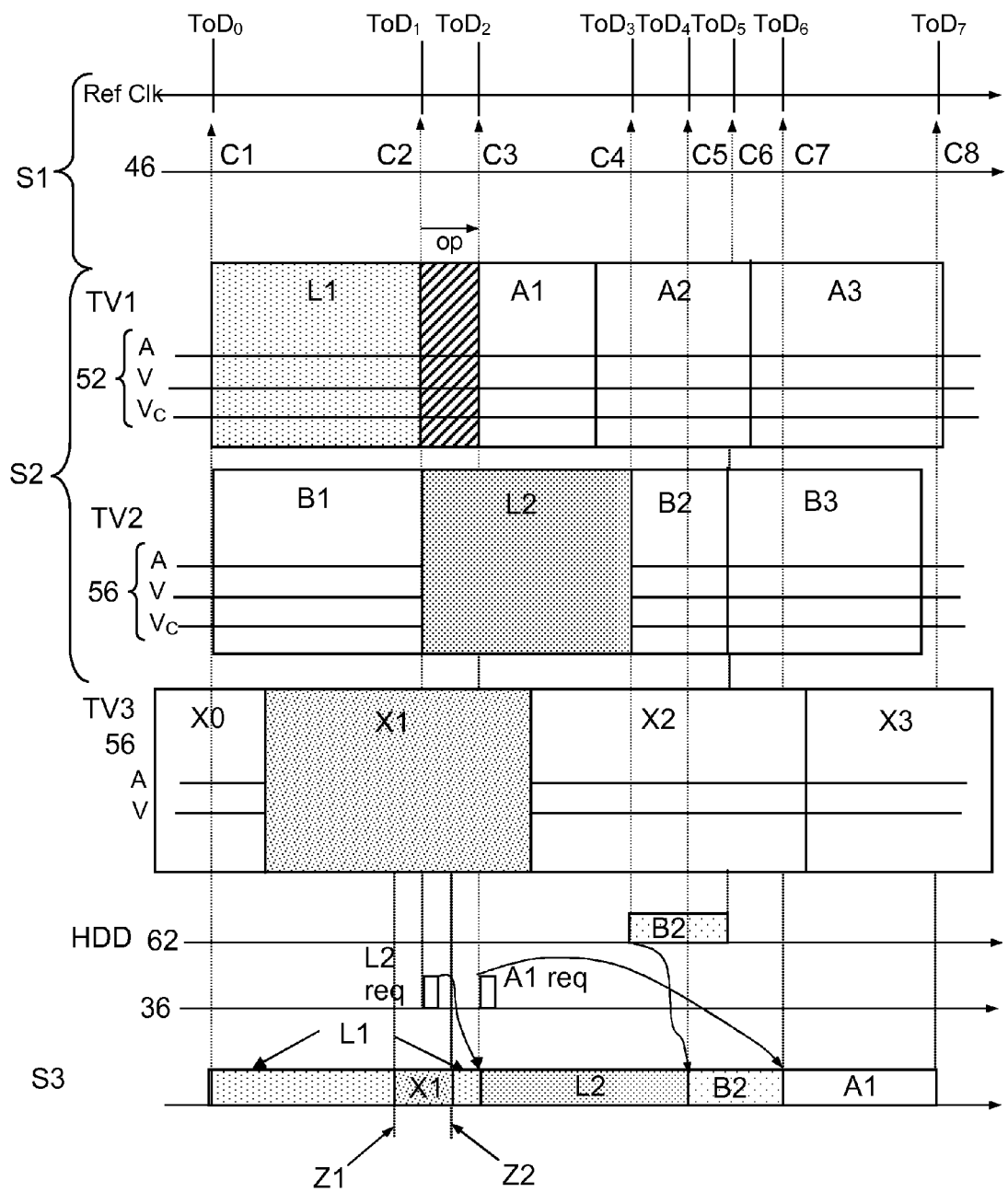
FIG. 7 is a flowchart showing the steps of a method for providing a personalized content according to a fourth embodiment of the present invention.

The second case is illustrated on FIG. 7. In this case, L1 and L2 are live broadcast programs in the broadcast streams 52, 56 respectively. Besides, L1 overlaps on L2. Additionally, the second tuner 54 is not tuned on the second broadcast channel prior to the control command C2 due to the user who would like to watch in PIP (Picture In Picture) broadcast TV channels TV1 and TV3. The consequence is that the second tuner 54 is preempted and not available for a timeshifting of the live program L2 broadcast in the second broadcast stream 56.

Here, the TV channel TV1 is the channel containing L1, the TV channel TV2 is the channel containing L2, and the TV channel TV3 does not contain any program included in the personalized content. Thus TV3 has no timeline component and is asynchronous with the other TV channels TV1, TV2.

The program sequencing illustrated on FIG. 7 is as follows, comprising received commands CI in the control stream 46 and actions from the user:
C1: start to play L1 received on the first tuner 50;
Z1: the user zaps on X1 received on the second tuner 54 and preempts said second tuner consequently;
C2: send a request to get L2 from the catch-up server 36;
Z2: the user zaps on L1 again
C3: switch (and optionally fade from L1 to L2) to L2 streamed over the catch-up server 36 and send a request to get A1;
C4: start timeshifting of B2 on the memory 62;
C5: start to play B2, while downloading it on the memory 62, and fade from L2 to B2;
C6: stop timeshifting B2;
C7: start to play A1 streamed from the catch-up server 36 and fade from B2 to A1;
C8: stop to play A1.

For all the scenarios described above and especially for the scenarios involving live events, an efficient update of the control information has to be performed. The provider device 32, supposed to have the playlists of all the required TV channels for recovering the personalized content, must also dispose of a reliable and accurate update mechanism to apply possible corrections of the control information to the initial program sequencing. In the case where the change on the live event occurs too late to be updated on time by the provider device 32, a conservative solution based on an overlap detection is proposed at the receiver side. It involves a mechanism hosted in the detection module 69 of the receiver device 34 which is able to detect the possibility of live content overlapping.

The overlap detection implemented in the receiver device 34 can be based on statistical processing of data collected prior to the switch from one live event to a different one. Typically, a user interface may propose to all the subscribers of the thematic channel corresponding to the personalized content a question such as: "would you like to pursue to watch the program as it will shortly switch to your planned favorite one?". If the ratio of the answers "no" is over a determined threshold, as for instance 80% of answers are no, this means that the current live program has a good chance to continue and then to overlap on the next one. In this case, the "switch" control command initially planned by the program manager 38 has to be replaced by the commands described with reference to FIGS. 6 and 7. In case the overlap detection is wrong, the user has always the possibility to switch manually to the next program initially planned.

An alternate overlap detection method could be implemented in the detection module 45 of the provider device 32 and would be to monitor a social network, for example to catch the ratio of occurrence of key words, as for example in a soccer game, the words "continuation, extra time", related to the live event currently under analysis.

Another option could be to have a priority on the program depending on a user profile. An information to indicate that the current program is not finished is associated to the switch request (C2 in the above example). Depending on the priority level of the current and next program, the receiver device will switch or not.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", is and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

Thus, even if the above description focused on providing a personalized content as a thematic channel, it can be advantageously applied to improve the use of the broadband network bandwidth.

In fact, by assuming that every content component of a TV service can be delivered either via broadcast or via broadband, the present invention permits the creation of a complete TV service from those components just in the user terminal according to a pre-transmitted schedule of events.

In the above description, the scheduler operation is part of the receiver device. However, it may be advantageous, without departing from the scope of the invention, to have a part or all of the processing of the scheduler hosted and performed in a cloud architecture.

The invention claimed is:

1. A method for providing personalized content having a sequencing of media content, at a receiver device, comprising:
   receiving, in a control channel, a control stream comprising temporal control information describing the media content sequencing, the sequencing including a first live program followed by a second live program, the first live program and the second live program being broadcast in real time;
   receiving media streams including the media content of the sequencing; and
   controlling a rendering of the personalized content by using said control information, the control information including a first switch control command to transition from the rendering of the first live program- to the rendering of the second live program,
   detecting if there is an overlap between the first live program and the second live program, according to which the first live program is not finished at a time of the transition from the rendering of the first live program to the rendering of the second live program,
   wherein if the overlap between the first live program and the second live program is detected, the method further comprises replacing the first switch control command by a second switch control command to transition from the rendering of the first live program to the rendering of the second live program, said second switch control command time-shifting the transition from the rendering of the first live program to the rendering of the second live program.

2. The method of claim 1, wherein the media content originates from corresponding television channels.

3. The method of claim 2, wherein the control channel and the television channels are time aligned to a common reference clock.

4. The method of claim 3, wherein the control stream and the media stream comprise temporal information for aligning the control channel and the television channel to the common reference clock.

5. The method of claim 1, wherein the personalized content comprises a previously stored content in a user's device.

6. The method of claim 1, wherein said first switch control command is a fading control.

7. The method of claim 1, wherein the media streams are received over broadcast and/or broadband networks.

8. The method of claim 1, wherein said second switch control command comprises time-shifting the rendering of the second live program until the first live program is finished.

9. The method of claim 1, detecting the overlap between the first live program and the second live program is based on statistical processing of data collected prior to a switch from the first live program to the second live program.

10. The method of claim 1, wherein detecting the overlap between the first live program and the second live program is based on a monitoring of a social network.

11. A receiver device for providing personalized content having a sequencing of media contents, comprising:
   a first interface for receiving, in a control channel, a control stream comprising temporal control information describing the media content sequencing;

a second interface for receiving media streams comprising the media contents of the sequencing, the sequencing including a first live program followed by a second live program, the first live program and the second live program being broadcast in real time;

a scheduler for controlling a rendering of the personalized content by using said control information, the control information including a first switch control command to transition from the rendering of the first live program to the rendering of the second live program; and a detection module for detecting an overlap between the first live program and the second live program, according to which the first live program is not finished at a time of the transition from the rendering of the first live program to the rendering of the second live program, so that upon detection of the overlap said scheduler replaces the first switch control command by a second switch control command to transition from the rendering of the first live program to the rendering of the second live program, said second switch control command time-shifting the transition from the rendering of the first live program to the rendering of the second live program.

12. The receiver device of claim 11, said receiver device being a gateway or a set-top box.

13. A provider device for providing personalized content having a sequencing of media content, the sequencing including a first live program followed by a second live program, the first live program and the second live program being broadcast in real time, comprising:

a program manager for defining temporal control information describing the media content sequencing, the control information including a first switch control command to transition from the rendering of the first live program to the rendering of the second live program;

a first transmitter for transmitting, in a control channel, a control stream comprising said temporal control information;

a second transmitter for transmitting media streams including the media contents of the sequencing, the sequencing including a first live program followed by a second live program; and a detection module for detecting an overlap between the first live program and the second live program, according to which the first live program is not finished at a time of the transition from the rendering of the first live program to the rendering of the second live program, so that upon detection of the overlap said program manager replaces the first switch control command by a second switch control command to transition from the rendering of the first live program to the rendering of the second live program, said second switch control command time-shifting the transition from the rendering of the first live program to the rendering of the second live program.

14. A program storage device, readable by a computer, tangibly embodying a program of instructions executable by the computer to perform a method for providing a personalized content having a sequencing of media contents, comprising:

receiving, in a control channel, a control stream including temporal control information describing the media content sequencing, the sequencing including a first live program followed by a second live program, the first live program and the second live program being broadcast in real time;

receiving media streams including the media contents of the sequencing; and controlling a rendering of the personalized content by using said control information, the control information including a first switch control command to transition from the rendering of the first live program to the rendering of the second live program;

detecting if there is an overlap between the first live program and the second live program, according to which the first live program is not finished at a time of the transition from the rendering of the first live program to the rendering of the second live program;

if the overlap between the first live program and the second live program is detected, replacing the first switch control command by a second switch control command to transition from the rendering of the first live program to the rendering of the second live program, said second switch control command time-shifting the transition from the rendering of the first live program to the rendering of the second live program.

* * * * *